United States Patent Office 3,682,877
Patented Aug. 8, 1972

3,682,877
PRODUCTION OF VINYL CHLORIDE POLYMER OF PREDETERMINED PARTICLE SIZE DISTRIBUTION AND APPARENT DENSITY
Arno Czekay, Knapsack, Bruno Kramer, Hurth, and Karl Kaiser, Bruhl, Germany, assignors to Knapsack Aktiengesellschaft, Knapsack, near Cologne, Germany
No Drawing. Filed Mar. 8, 1971, Ser. No. 122,175
Claims priority, application Germany, Mar. 24, 1970, P 20 14 016.3
Int. Cl. C08f 1/11, 3/30
U.S. Cl. 260—92.8 W             10 Claims

ABSTRACT OF THE DISCLOSURE

Production of a vinyl chloride polymer of predetermined particle size distribution and apparent density by subjecting vinyl chloride to polymerization in suspension, wherein monomeric vinyl chloride, placed in a reactor, is polymerized in aqueous dispersion, with agitation. More particularly, the vinyl chloride is produced by varying at least once the initial stirring velocity in the reactor during polymerization and conditional upon the particle size distribution determined from time to time for the polymer, the initial stirring velocity being either increased with the resultant formation of a final polymer containing an increased proportion of relatively coarse particles, or reduced with the resultant formation of a final polymer containing an increased proportion of fine particles, and by maintaining the varied stirring velocity until completion of the polymerization, if necessary or convenient.

---

The present invention relates to the production of vinyl chloride polymers of predetermined particles size distribution and apparent density, wherein monomeric vinyl chloride is polymerized in suspension in contact with a suspension stabilizer and a monomer-soluble catalyst, and wherein the particle size distribution in the finished dry polymer is established by varying the velocity of stirring during the polymerizing step.

It is known that polyvinyl chloride can be produced commercially by polymerizing vinyl chloride in aqueous dispersion in contact with a suspension stabilizer and a catalyst which is soluble in vinyl chloride, for example lauroyl peroxide, with the resultant formation of a product consisting of powder particles or beads having an average size of between 20 and 500 microns. To be suitable for finishing treatment, it is an important requirement for these polymers to have firstly a given particle size distribution and secondly a given apparent density. A vinyl chloride polymer, briefly called PVC hereinafter, is up to the standard specifications of the PVC-processing industries when it shows the following particle size distribution for an apparent density of between 540 and 580 grams/liter and a K-value of between 60 and 70.

| Microns: | Percent |
|---|---|
| <63 | 10–15 |
| 63–125 | 30–45 |
| >125 | 40–60 |
| >250 | 0 |

Considerable difficulties have been encountered heretofore in the production of PVC-powders conform to the above specification. The reason for this resides in the fact that the particle size distribution established during polymerization changes continuously, despite the use of constant polymerization conditions, such as temperature, pressure, velocity of stirring and similar conditions. The varying proportions of contaminants, which appear in monomeric vinyl chloride, have inter alia been found to effect the continuous change of the particle size distribution in PVC-powder. These contaminants originate from vinyl chloride production and traces thereof appear in it, regardless of whether the vinyl chloride is produced by the additive combination of hydrogen chloride with acetylene, or by the cracking of dichloroethane. The following contaminants, for example, may be found to appear in vinyl chloride produced by the cracking of dichloroethane, for use in polymerization reactions:

| | Parts per million |
|---|---|
| 1-butane | 1 |
| 1,3-butadiene | 11 |
| Methyl chloride | 18 |
| Ethyl chloride | 5 |
| Monovinyl acetylene | 5 |
| 1,1-dichloroethane | 5 |
| 1,2-dichloroethane | 5 |
| Acetaldehyde | 8 |

However, regardless of these minor proportions of vinyl chloride contaminants, it cannot be ignored that they affect the particle size distribution in PVC-powder. For the production of PVC-powder of predetermined particle size distribution, it has been necessary heretofore to use different grades of PVC-powder, which originate from individual polymerization batches and accordingly have an irregular particle size distribution, and mechanically to blend these powders in given balanced mixing ratios. This is a complicated procedure which dictates the constant availability of components of suitable particle size distribution, for the production of a given blend.

It is known that the average size of particles obtained by polymerization in suspension can be reduced by increasing the velocity of stirring during the polymerization. This is the fact upon which the invention described in German published specification 1,076,373 is based. This specification describes the production of substantially electrolyte-free dispersions of vinyl chloride polymers consisting of particles with a size of between 0.5 and 5.0 microns, wherein vinyl chloride is polymerized in aqueous dispersion in contact with a protective colloid and a monomer-soluble catalyst in an autoclave fitted with an agitator of which the speed of rotation can be varied. This process comprises more particularly operating the agitator, prior to and/or while heating the material placed in the autoclave to the temperature necessary for polymerization, for a period of between 10 and 120 minutes at a peripheral velocity of between 7 and 15 meters/ second, successively reducing the peripheral velocity of the agitator down to 50 to 10% of the initial velocity, and maintaining the reduced velocity until termination of the polymerization.

However, this is a homogenization process that is carried out in an attempt by polymerization in suspension to produce a polymer of which the individual particles have a size approaching that of emulsion polymers, and therefore it clearly does not teach or suggest the process of the present invention, which relates to the production of PVC-powder of predetermined particle size distribution and apparent density. In accordance with the present invention, we have unexpectedly discovered that the problem underlying our present invention can be solved by varying the velocity of stirring during polymerization.

The present invention relates more particularly to a process for the manufacture of a vinyl chloride polymer of predetermined particle size distribution and apparent density by subjecting vinyl chloride to polymerization in suspension, wherein monomeric vinyl chloride, placed in a closed reactor, is polymerized in aqueous dispersion, in contact with a suspension stabilizer and a monomer-soluble catalyst, at temperatures of between about 55 and 65° C., with agitation, and wherein the resulting polymer is isolated and dried, which process comprises periodically varying at least once the initial stirring velocity in the reactor during polymerization and conditional upon the particle size distribution determined from time to time for the polymer, the initial stirring velocity being either increased with the resulting formation of a final polymer containing an increased proportion of coarse particles, or reduced with the resultant formation of a final polymer containing an increased proportion of fine particles, and maintaining the varied stirring velocity until termination of the polymerization, if necessary or convenient.

The particle size distribution in the polymer during polymerization should preferably be determined by sampling, i.e. by taking a sample of reaction product present in the reactor, drying the sample and then determining the particle size distribution in conventional manner, for example by sieve analysis.

A preferred feature of the present process comprises polymerizing monomeric vinyl chloride which contains traces of one or more of the following compounds as contaminants: 1-butane, 1,3-butadiene, methyl chloride, ethyl chloride, monovinyl acetylene, vinylidene chloride, 1,1-dichloroethane, 1,2-dichloroethane or acetaldehyde.

The polymerization may be carried out in contact with customary suspension stabilizers and monomer-soluble catalysts. The useful stabilizers include, for example methylcellulose, oxyalkylcelluloses, polyvinyl alcohol and suitable mixtures thereof, and the useful catalysts include, for example lauroyl peroxide, diisopropylperoxydicarbonate or tertiary butyl perpivalate.

A further preferred feature of the present invention comprises varying the stirring velocity by varying the speed of rotation of the agitator within an advantageous range, i.e. by operating the agitator at a speed of between about 50 and 200 r.p.m., preferably 100 and 150 r.p.m., or at a peripheral speed of between about 5 and 15, preferably 8 and 13 meters/second. At the start of the polymerization, the agitator is set to work at a speed of rotation which is selected conditional upon the nature and quantity of contaminants present in the monomeric vinyl chloride. In other words, the polymerization process is started with the agitator rotating at a high or low speed, conditional upon the contaminants present. Test series have shown, for example, that the formation of relatively coarse particles tends to be favored, and the courser the particles, the smaller the proportions of contaminants in vinyl chlorodie. In the extreme case, a monomer sample should conveniently be polymerized so as to get an idea of the particle size distribution which the resulting polymer is likely to have. This facilitates the selection of the initial stirring velocity to be used during polymerization.

By the process of the present invention, it is more particularly possible to produce PVC-powders that combine a K-value of between 60 and 70 and an apparent density of between 500 and 700 grams/liter with the following preferred particle size distribution:

| Microns: | Percent |
|---|---|
| <63 | 10–15 |
| 63–125 | 30–45 |
| >125 | 40–60 |
| >250 | 0 |

As compared with earlier processes, the present invention offers beneficial effects in that it enables PVC-powder of predetermined particle size distribution and apparent density to be produced in a single step operation, regardless of the monomer quality. A further advantage results from the fact that it is no longer necessary to keep a stock of PVC-powders of varying particle size distribution, which were previously required to be used for the production of special PVC-powder blends. Still further, it is possible from now on continuously to produce PVC-powders of predetermined particle size distribution.

The following examples further illustrate the process of the present invention.

EXAMPLE 1 (Comparative example)

A 5,000 liter agitator autoclave fitted with a flow breaker and an infinitely variable impeller mixer was fed with the following components:

3,000 liters of water freed from salt,
1,800 liters of vinyl chloride, grade A,
1,000 grams of methylcellulose,
2,800 grams of polyvinyl alcohol, and
3,000 grams of lauroyl peroxide.

The grade A vinyl chloride contained the following contaminants:

| | P.p.m. |
|---|---|
| 1-butane | 1 |
| 1,3-butadiene | 11 |
| Methyl chloride | 18 |
| Ethyl chloride | <5 |
| Monovinylacetylene | <5 |
| 1,1-dichloroethane | <5 |
| 1,2-dichloroethane | <5 |
| Acetaldehyde | 8 |

The polymerization batch was heated to 60° C. and stirred for 10 hours while the agitator rotated at a speed of 100 r.p.m., or at a peripheral speed of 8.5 meters/second. Following completion of the reaction, the reaction mixture was cooled, the polymer was isolated and dried. The PVC-powder so obtained was subjected to sieve analysis and the particle size distribution indicated in the table hereinafter was determined. The powder had an apparent density of 630 grams/liter.

EXAMPLES 2 AND 3 (Comparative examples)

The procedure was the same as that described in Example 1, save that the agitator rotated at a speed of 120 r.p.m. or a peripheral speed of 10.5 meters/second (in Example 2), and at a speed of 150 r.p.m. or 13.0 meters/second (in Example 3). The particle size distribution determined for each of the powders obtained in Examples 2 and 3, respectively, is indicated in the table hereinafter. The apparent density was 575 grams/liter and 515 grams/liter, respectively.

EXAMPLE 4 (Comparative example)

A PVC-powder with an apparent density of 570 grams/liter and the following particle size distribution

| Microns: | Percent |
|---|---|
| <63 | ~14 |
| 63–125 | ~30 |
| >125 | ~55 |
| >250 | 0 | was produced. To this end, the PVC-powders produced in the manner described in Examples 1 to 3 were blended in various quantitative ratios, and the particle size distribution was determined for each of the blends so made. A blend made from the above powders in a mixing ratio of 1:1.2 was found to meet the above specifications. The particle size distribution determined for the blend is indicated in the table hereinafter.

EXAMPLE 5 (Process of invention)

A PVC-powder with the particle size distribution and apparent density indicated in Example 4 was produced. To this end, the polymerization batch used in Example 1 was polymerized under analogous conditions, save that the batch was first stirred for 2 hours at a speed of the agitator of 150 r.p.m., or at a peripheral speed of 13.0 meters/second. Following this, a sample was taken, dried and the particle size distribution was determined. It was found that 76% of the pulverulent polymer consisted of particles with a size of more than 125 microns. In other words, the polymer contained too large a proportion of particles of maximum size. In order to reduce this proportion down to about 55%, the speed of rotation was reduced down to 100 r.p.m. or 8.5 meters/second peripheral velocity, and maintained for a further 6 hours until the polymerization was complete. The particle size distribution and apparent density determined for the polymer obtained as final product are indicated in the Table hereinafter.

EXAMPLES 6 to 8 (Comparative examples)

The tests described in Examples 1 to 3 were repeated save that vinyl chloride, grade B, was used, which contained the following contaminants:

|  | P.p.m. |
|---|---|
| 1-butane | 3 |
| 1,3-butadiene | 35 |
| Methyl chloride | 45 |
| Ethyl chloride | <5 |
| Monovinylacetylene | 8 |
| Vinylidene chloride | <5 |
| 1,1-dichloroethane | 9 |
| 1,2-dichloroethane | 13 |
| Acetaldehyde | <3 |

The PVC-powders so produced had the characteristic data indicated in the table hereinafter.

EXAMPLE 9 (Comparative example)

A PVC-powder having the apparent density and particle size distribution indicated in Example 4 was produced by mechanically blending together the PVC-powder produced in the manner described in Examples 6 and 7. The mixing ratio was 2:3. The exact data determined for the particle size distribution and apparent density of the blend are indicated in the table hereinafter.

EXAMPLE 10 (Process of invention)

The procedure was the same as that described in Example 5, save that grade B vinyl chloride was used. The polymerization batch was stirred first for 4 hours at a speed of 150 r.p.m. or a peripheral speed of 13.0 meters/second, and then for a further 8 hours at 100 r.p.m. or 8.5 meters/second. The data determined for the PVC-powder so made are indicated in the table hereinafter.

EXAMPLE 11 (Process of invention)

The test described in Example 5 was repeated, save that the polymerization batch was stirred first for 3.5 hours at a speed of 100 r.p.m. or a peripheral speed of 8.5 meters/second, and then for a further 6.5 hours at 150 r.p.m. or 13.0 meters/second. The data determined for the PVC-powder so made are indicated in the following table.

We claim:

1. In the process for the manufacture of a vinyl chloride polymer of predetermined particle size distribution and apparent density by subjecting vinyl chloride to polymerization in suspension, wherein monomer vinyl chloride, placed in a closed reactor, is polymerized in aqueous dispersion, in contact with a suspension stabilizer and a monomer-soluble catalyst, at temperatures of between about 55 and 65° C., with agitation, and the resulting polymer is isolated and dried, the improvement which comprises periodically varying the initial stirring velocity of the agitator in the reactor during polymerization and conditional upon the particle size distribution determined from time to time for the polymer, the initial stirring velocity being either increased with the resultant formation of a final polymer containing an increased proportion of relatively coarse particles, or reduced with the resultant formation of a final polymer containing an increased proportion of fine particles, and maintaining the varied stirring velocity until completion of the polymerization, if necessary or convenient.

2. The process as claimed in claim 1, wherein the initial stirring velocity is varied a number of times during the polymerization.

3. The process as claimed in claim 1, wherein the particle size distribution of the polymer is determined by taking a sample of reaction product from the reactor, drying the sample and determining the particle size distribution therein.

4. The process as claimed in claim 1, wherein the vinyl chloride to undergo polymerization contains traces of contaminants selected from the group consisting of 1-butane, 1,3-butadiene, methyl chloride, ethyl chloride, monovinylacetylene, vinylidene chloride, 1,1-dichloroethane, 1,2-dichloroethane, acetyldehyde and mixtures thereof.

5. The process as claimed in claim 1, wherein the suspension stabilizer is methyl cellulose, an oxy-alkylcellulose, polyvinyl alcohol or a mixture thereof.

6. The process as claimed in claim 1, wherein the catalyst is lauroyl peroxide, diisopropylperoxydicarbonate or tertiary butyl perpivalate.

7. The process as claimed in claim 1, wherein the agitator is operated at a speed of between about 50 and 200 r.p.m., or at a peripheral speed of between about 5 and 15 meters/second.

8. The process as claimed in claim 7, wherein the agitator is operated at a speed of between about 100 and 150 r.p.m. or at a peripheral speed of between 8 and 13 meters/second.

9. The process as claimed in claim 1, wherein the polymerization is started with the agitator rotating at a high or low speed, conditional upon the nature and quantity of contaminants present in the monomeric vinyl chloride.

10. The process as claimed in claim 1, wherein the resulting and dried vinyl chloride polymer has a K-value

TABLE

| Example number | PVC grade | Peripheral velocity | R.p.m. | Polymerization period, hrs. | Apparent density, grams/liter | Particle size distribution in percent | | | |
|---|---|---|---|---|---|---|---|---|---|
|  |  |  |  |  |  | <63μ | 63–125μ | >125μ | >250μ |
| 1 | A | 8.5 | 100 | 10 | 630 | 28 | 45 | 27 | 0 |
| 2 | A | 10.5 | 120 | 10 | 575 | 17 | 36 | 47 | 0 |
| 3 | A | 13.0 | 150 | 10 | 515 | 5 | 19 | 76 | 0 |
| 4 |  |  |  |  | 570 | 13.7 | 30 | 56.8 | 0 |
| 5 | A | 13.0 / 8.5 | 150 / 100 | 2 / 6 | 570 | 14 | 31 | 55 | 0 |
| 6 | B | 8.5 | 100 | 10 | 650 | 31 | 51 | 18 | 0 |
| 7 | B | 10.5 | 120 | 10 | 585 | 21 | 43 | 36 | 0 |
| 8 | B | 13.0 | 150 | 10 | 525 | 9 | 23 | 68 | 0 |
| 9 |  |  |  |  | 560 | 13.9 | 31 | 55.2 | 0 |
| 10 | B | 13.0 / 8.5 | 150 / 100 | 4 / 8 | 565 | 13 | 29 | 58 | 0 | of between 60 and 70, an apparent density of between about 500 and 700 grams/liter and a preferred particle size distribution of

| Microns: | Percent |
|---|---|
| <63 | 10–15 |
| 63–125 | 30–45 |
| >125 | 40–60 |
| >250 | 0 |

References Cited

UNITED STATES PATENTS 3,544,539   12/1970   Shunichi Koyanagi
                                                260—92.8 W JOSEPH L. SCHOFER, Primary Examiner J. A. DONAHUE, Jr., Assistant Examiner